May 16, 1944.    R. A. LEHMAN ET AL    2,348,984
SODIUM BISMUTH TRIGLYCOLLAMATE
Filed June 25, 1942
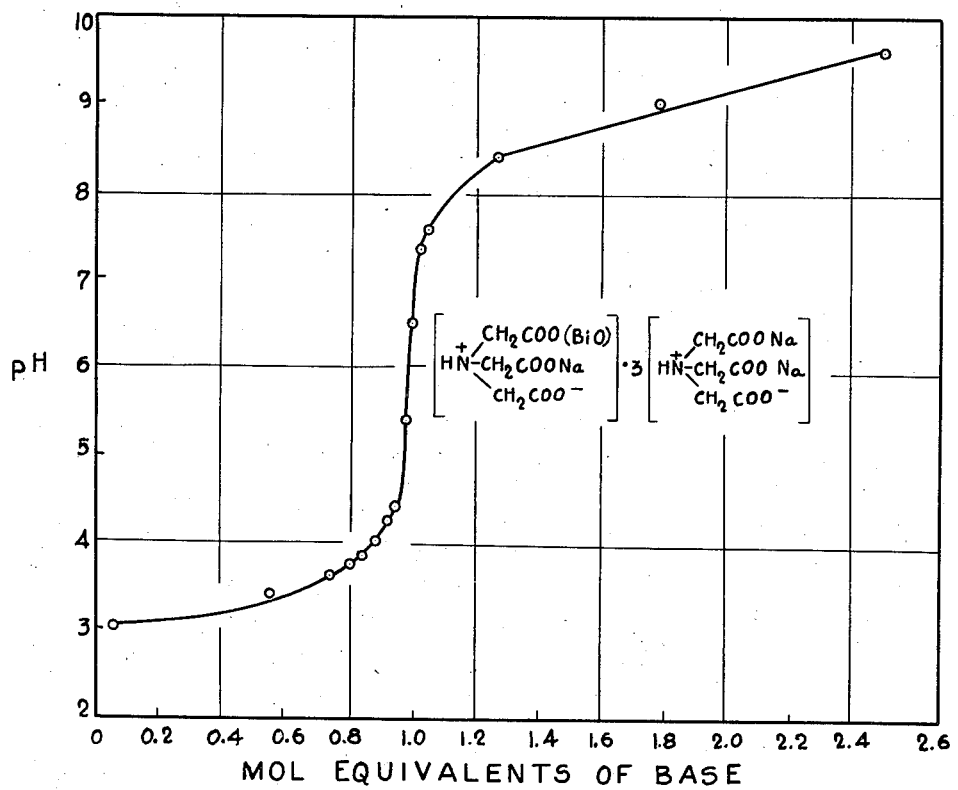

Patented May 16, 1944

2,348,984

UNITED STATES PATENT OFFICE 2,348,984

SODIUM BISMUTH TRIGLYCOLLAMATE

Robert A. Lehman, New York, N. Y., and Reavis C. Sproull, Pittsfield, Mass.

Application June 25, 1942, Serial No. 448,514

3 Claims. (Cl. 260—447)

The use of bismuth, in the form of water soluble bismuth compounds, in the treatment of syphilis is well known, and many compounds such as sodium bismuth cevitamate, sodium bismuth citrate, potassium bismuth saccharate, potassium bismuth tartrate, etc., have been employed in this way.

A desirable characteristic for these compounds which, however, is possessed by the known compounds to only a limited degree, is simultaneous high chemical stability toward the ions present in tissue fluids, such as chloride and phosphate ions, and high intramuscular and gastrointestinal absorption.

The present invention is now concerned with the production of a new compound of bismuth with triglycollamic acid (sym.-tricarboxytrimethylamine), and is based upon the following discoveries and considerations.

When a hot aqueous solution of triglycollamic acid is boiled with one mol equivalent of bismuth (as $Bi_2O_3$), a clear solution results, which upon cooling throws down, in good yield, crystals whose structure may best be formulated as follows:

I 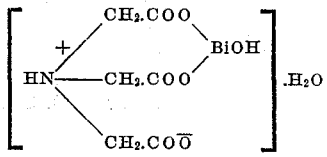

This substance, which will be referred to as acid bismuth triglycollamate, can be readily recrystallized from water without hydrolysis of the bismuth.

On drying the said crystals to constant weight, two molecules of water are eliminated, the following compound resulting:

II 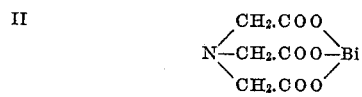

A saturated solution of Compound I is quite unstable with respect to chemical reagents, for hydroxyl, chloride, or phosphate ions precipitate the appropriate bismuth salts.

While only slightly soluble in cold water, Compound I is very soluble in an aqueous solution of disodium triglycollamate, forming a series of double salts or complex ions corresponding to the following general formula:

III(a) 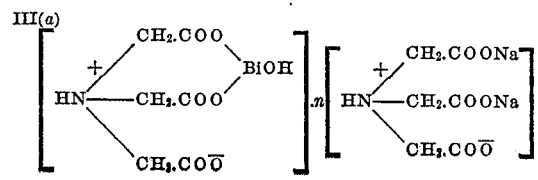

wherein $n$ represents 0, 1, 2, 3, 4 or 5. These may be crystallized out of solution in the form of hydrated crystals.

The accompanying figure on the drawing shows the titration curve obtained upon titration, with sodium hydroxide, of an aqueous solution of Compound I in the presence of three mol equivalents of disodium triglycollamate and having initially a pH of 3.0. The titration curve shows that one mol equivalent of base has been consumed at the inflection, at which point the solution is substantially neutral.

Neutralization of one carboxyl group in Compound I with sodium hydroxide in presence of excess disodium triglycollamate thus yields solutions of the following series of compounds:

III(b) 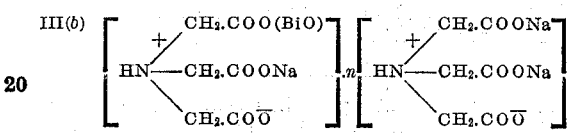

wherein $n$ represents 0, 1, 2, 3, 4 or 5 and which may be crystallized out of solution as hydrated crystals.

The presence of the disodium triglycollamate has been found to greatly increase the stability of these solutions toward chemical reagents and in proportion to the amount present.

Thus, when $n=3$, in Type III(b), and the resulting solution is 0.05 M with respect to bismuth, no precipitation occurs upon addition of phosphate or chloride ions, nor within the pH range 2.8 to 10.0. Such a solution is stable to light and when sterile can be stored indefinitely. It can be evaporated to dryness or greatly diluted without chemical changes.

The compounds wherein $n$ represents 4 or 5 are characterized by even greater chemical stability. All these compounds are, moreover, absorbed from the gastrointestinal tract and from the site of intramuscular injection at a higher rate, at comparable pH, than the water soluble bismuth compounds hereinbefore enumerated. Furthermore, the new compounds are of sufficiently low toxicity to make them of high therapeutic value.

The following illustrative examples more particularly exemplify the present invention:

Example I

Triglycollamic acid was prepared as described by Michaelis and Schubert, J. Biol. Chem., 106, 331, (1934), except that the much less expensive chloracetic acid was used in place of iodoacetic acid.

14 g. of bismuth oxide, $Bi_2O_3$, were suspended in a solution of 11.5 g. of triglycollamic acid in 4000 cc. of boiling water. The suspension was boiled until a clear or only slightly turbid solution resulted. The solution was then filtered and chilled to 5° C. The separated fine colorless needles were filtered, washed, dried and recrystallized, hydrolysis being prevented by dissolving the crystals in a just sufficient amount (about 125 cc. per gram of salt) of distilled water, already at the boiling point, filtering and chilling rapidly.

The resultant crystals of acid bismuth triglycollamate (Compound I) have a solubility in water at room temperature of about 0.09 g. per 100 cc. and decompose at 258–262° C. uncorrected when the temperature of the melting point bath is raised at the rate of 2° per minute.

*Example II*

To 7.64 g. of triglycollamic acid suspended in about 100 cc. of water were added 3.18 g. of anhydrous sodium carbonate dissolved in 50 cc. of water. The resulting solution was brought to boiling and 4.66 g. of bismuth oxide ($Bi_2O_3$), previously triturated with water, were added in small portions. The mixture was then boiled until clear, filtered and evaporated on the steam bath to about 35 cc. volume. Upon standing overnight at room temperature, large colorless prisms were formed. These were collected on a filter, washed with ice water, and recrystallized. The resultant tetrahydrate crystals of the double salt (Compound III(b), wherein $n=1$) must be preserved in a sealed container since they effloresce rapidly in air. This substance is very soluble in water; it decomposes on heating in the melting point bath.

*Example III*

A mixture of 2.33 g. of bismuth oxide ($Bi_2O_3$), 3.71 g. of anhydrous sodium carbonate, and 7.64 g. of triglycollamic acid and 40 cc. of water was heated at 80° C. on the water bath until all was dissolved. The solution was evaporated on the water bath to a syrup. The syrup was allowed to cool, during which time partial solidification occurred. It was then triturated with 300 cc. of alcohol, and the solid anhydrous salt (Compound III(b), where $n$ represents 3) was collected on a filter, washed with alcohol, ground fine, and dried in a vacuum desiccator. This substance has a water solubility at 25° C. of 31.8 per cent by weight. It decomposes on heating in the melting point bath.

The double salts, where $n$ represents 4 or 5, are prepared in an analogous manner.

The literature contains a reference to the preparation of

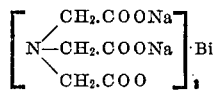

No claim is made to this compound or to the process whereby it may allegedly be prepared, but what is here claimed are the specifically different new complex sodium bismuth salts of triglycollamic acid hereinbefore described and specifically defined in the following claims.

What is claimed is:

1. The compounds of the formula

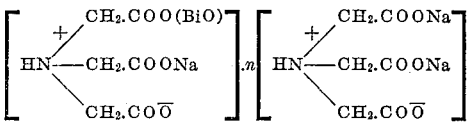

wherein $n$ represents one of the group consisting of 0, 1, 2, 3, 4 and 5, and their crystalline hydrates.

2. The compound of the formula

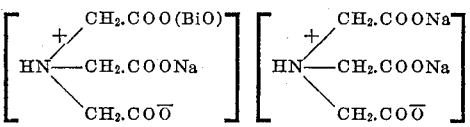

and its crystalline tetrahydrate.

3. The compound of the formula

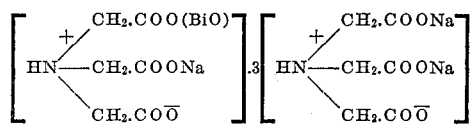

ROBERT A. LEHMAN.
REAVIS C. SPROULL.